US009134072B2

(12) United States Patent
Roisin et al.

(10) Patent No.: US 9,134,072 B2
(45) Date of Patent: Sep. 15, 2015

(54) GEOMETRY OF HEAT EXCHANGER WITH HIGH EFFICIENCY

(75) Inventors: Benoit Roisin, Croydon, NH (US); Ian Estle Graves, Seattle, WA (US)

(73) Assignee: The Trustees of Dartmouth College, Hanover, NH (US)

(*) Notice: Subject to any disclaimer, the term of this patent is extended or adjusted under 35 U.S.C. 154(b) by 412 days.

(21) Appl. No.: 13/635,591

(22) PCT Filed: Mar. 14, 2011

(86) PCT No.: PCT/US2011/028300
§ 371 (c)(1),
(2), (4) Date: Apr. 29, 2013

(87) PCT Pub. No.: WO2011/115883
PCT Pub. Date: Sep. 22, 2011

(65) Prior Publication Data
US 2013/0206374 A1 Aug. 15, 2013

Related U.S. Application Data

(60) Provisional application No. 61/314,052, filed on Mar. 15, 2010.

(51) Int. Cl.
| B23P 15/26 | (2006.01) |
| F28D 7/00 | (2006.01) |
| B22F 7/00 | (2006.01) |
| F28F 7/02 | (2006.01) |
| F28F 21/08 | (2006.01) |
| C22C 1/08 | (2006.01) |
| F28D 21/00 | (2006.01) |

(52) U.S. Cl.
CPC .............. *F28D 7/0041* (2013.01); *B22F 7/002* (2013.01); *B23P 15/26* (2013.01); *F28D 7/0008* (2013.01); *F28D 7/0066* (2013.01); *F28F 7/02* (2013.01); *F28F 21/084* (2013.01); *C22C 1/08* (2013.01); *F28D 2021/007* (2013.01); *F28F 2210/02* (2013.01); *Y10T 29/4935* (2015.01)

(58) Field of Classification Search
CPC ......... B22F 7/002; C22C 1/08; F28D 1/0408; F28D 1/0417; F28D 1/0426; F28D 7/0041; F28D 7/008; F28D 7/02; F28D 7/0066; F28D 7/0083; F28F 21/084; F28F 7/02; F28F 2210/02; Y10T 29/4936
See application file for complete search history.

(56) References Cited

U.S. PATENT DOCUMENTS 3,229,762 A * 1/1966 Vollhardt ...................... 165/157

FOREIGN PATENT DOCUMENTS

| JP | 58069393 A | 4/1983 |
| JP | 2008121908 A | 5/2008 |
| KR | 1020060011853 A | 2/2006 |

OTHER PUBLICATIONS

International Search Report and Written Opinion issued in PCT/US201/028300 dated Oct. 31, 2011.

*Primary Examiner* — Alexander P Taousakis
(74) *Attorney, Agent, or Firm* — Lathrop & Gage LLP (57) ABSTRACT

The present disclosure includes geometry of a two-fluid heat exchanger to provide higher energy efficiency than conventional heat exchangers. The geometry is based upon sequential branching of nearly circular passages in sets, followed by some deformation and twisting of the sequential branches that intermingle flow passages of one fluid with flow passages of another fluid. The flow passages gradually vary in dimension from larger branching at fluid entrance and exit to smaller branching in the middle section of the heat exchanger. The heat exchanger is substantially symmetric, with the sequential branching in the first half being mirrored as serial regrouping in the second half. The present disclosure also provides stacking methods and layered manufacturing methods for fabricating the three-dimensional geometry of the heat exchanger.

37 Claims, 8 Drawing Sheets

GEOMETRY OF HEAT EXCHANGER WITH HIGH EFFICIENCY

CROSS-REFERENCE TO RELATED APPLICATIONS

This application claims the benefit of U.S. Provisional Patent Application No. 61/314,052, filed Mar. 15, 2010, entitled "Geometry of Heat Exchanger with High Efficiency," the entire content of which is incorporated herein by reference.

BACKGROUND OF THE INVENTION

This application relates to design of heat exchanger for allowing two fluids of different temperatures to exchange heat. More specifically, the design relates to geometry of heat exchangers.

Heat transfer occurs spontaneously whenever there is a temperature difference and, in principle, requires no source of mechanical energy. However, most applications in which heat transfer is performed, such as air-conditioning systems, rely on energy-consuming fans and blowers to force air, water or other fluids through high-drag configurations such as cross-tubes, radiator fins and brush-like surfaces.

BRIEF SUMMARY

Embodiments of the present disclosure include geometries of a two-fluid heat exchanger to provide higher energy efficiency than conventional heat exchangers. The geometries are based upon sequential branching of nearly circular passages in sets, followed by some deformation and twisting of the sequential branches that intermingle flow passages of one fluid with flow passages of another fluid. The flow passages gradually vary in dimension from larger branching at fluid entrance and exit to smaller branching in the middle section of the heat exchanger. The heat exchanger is substantially symmetric, with the sequential branching in the first half mirrored as serial regrouping in the second half. In one embodiment, intermingling occurs concurrently with splitting or branching. In another embodiment, splitting is followed by intermingling.

Embodiments of the present disclosure also provide stacking methods for fabricating the heat exchanger of three-dimensional geometry. Embodiments of the present disclosure further provide layered manufacturing methods for fabricating the heat exchanger of three-dimensional geometry.

In one embodiment, a heat exchanger for use with first and second fluids is provided. The heat exchanger includes a first flow passage for transporting the first fluid, the first flow passage having a first entrance end and a first exit end, and a second flow passage for transporting the second fluid, the second flow passage having a second entrance end and a second exit end. The second flow passage is physically separated from the first flow passage by a thermally conducting material. The first entrance end and the second exit end are adjacent a first end of the heat exchanger, and the first exit and the second entrance are adjacent an opposed second end of the heat exchanger. Each flow passage includes a parent channel adjacent the heat exchanger first end. Each parent channel is split into a plurality of first sub-channels during a first branching stage. A plurality of the first sub-channels is split into a plurality of second sub-channels during a second branching stage. The heat exchanger has a center portion with a maximum number of sub-channels. The first flow passage is generally symmetrical about the center portion, and the second flow passage is generally symmetrical about the center portion.

In another embodiment, a method for fabricating a heat exchanger is provided. The method includes forming through-holes in a plurality of layers, the through-holes having different sizes and locations such that the plurality of layers have gradually varying patterns of the through-holes. The method also includes stacking a first half of the plurality of layers to form a first half of the heat exchanger, such that the through-holes form half of a first flow passage for a first fluid and half of a second flow passage for a second fluid, the second flow passage being physically separated from the first flow passage. The first half of the heat exchanger spans from a first end of the heat exchanger to a center portion of the heat exchanger. The through-holes are configured and arranged such that each flow passage has at least one parent channel adjacent the first end of the heat exchanger. Each parent channel is split into a plurality of first sub-channels extending away from the first end of the heat exchanger during a first branching stage. A plurality of the first sub-channels are split into a plurality of second sub-channels during a second branching stage, the plurality of second sub-channels extending at a further depth than the plurality of first sub-channels from the first end of the heat exchanger. The method further includes stacking a second half of the plurality of layers in a reverse sequence from the first half of the plurality layers to form a second half of the heat exchanger. The second half and the first half of the heat exchanger is substantially symmetric about the center portion of the heat exchanger.

In a further embodiment, a method for fabricating a heat exchanger is provided. The method includes providing metallic powders and melting the metallic powders. The method also includes solidifying the melted metallic powders into subsequent layers. The layers have through-holes of different sizes and locations such that the plurality of layers have gradually varying patterns of the through-holes. The through-holes form a first flow passage for a first fluid and a second flow passage for a second fluid. The second flow passage is physically separated from the first flow passage. Each of the first and second flow passages has a parent channel near a first end of the heat exchanger. Each parent channel is split into a plurality of first sub-channels during a first branching stage. A plurality of the first sub-channels are split into a plurality of second sub-channels during a second branching stage. Each flow passage is substantially symmetrical about a center portion of the heat exchanger.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings.

DETAILED DESCRIPTION

The present disclosure may be understood by reference to the following detailed description taken in conjunction with the drawings as described below. For purposes of illustrative clarity, certain elements in the drawings are not drawn to scale.

It is desirable for heat exchanging systems to impose less friction to fluid motion, consume less mechanical energy, and achieve higher energy efficiency than conventional designs. Such heat exchangers may be useful in applications such as heat recycling in buildings, air-conditioning, and refrigeration, as well as automotive engine cooling and chemical engineering applications. It may also be desirable to reduce mechanical friction associated with heat exchangers used to transfer heat between two fluids by avoiding abrupt geometrical changes.

This application discloses a geometry based on sequential branching of circular passages in sets together with deformation and twisting of formed branches to intermingle passages of one fluid with passages of the other fluid. This reduces loss of mechanical energy typically associated with heat exchangers, including automotive radiators and condensers in air-conditioning units, and thus improves their energy efficiency. To minimize mechanical loss, a two-fluid heat exchanger described here has flow passages gradually changing from wider tubes at one end of the heat exchanger or device, which marks the entrance of one fluid and the exit of the other fluid, to finer tubes somewhere inside the device, where vigorous heat transfer takes place, and back to wider tubes at the other end of the device. Such gradual change in geometry avoids abrupt geometrical changes and reduces drag associated with fluid motion.

It may be desirable for flow passages to use a circular, or near-circular, cross-section that provides good rigidity and reduces friction instead of a rectangular cross-section or cross-section of another shape. For a given cross-sectional area, a flow passage, pipe or duct with a circular cross-section provides the least friction resistance, and typically less friction resistance than a flow passage that has a more oblong or rectangular cross-section. The circular passage is known to offer the least peripheral area for a given cross-sectional area and length of passage, and the less lateral surface that is provided to the fluid for contact, the less friction is formed between the fluid and the wall. The two-fluid heat exchanger with low-drag path or low friction may save energy wherever a heat exchanger is used to transfer heat from a warmer fluid to a colder fluid.

Figure 1A:
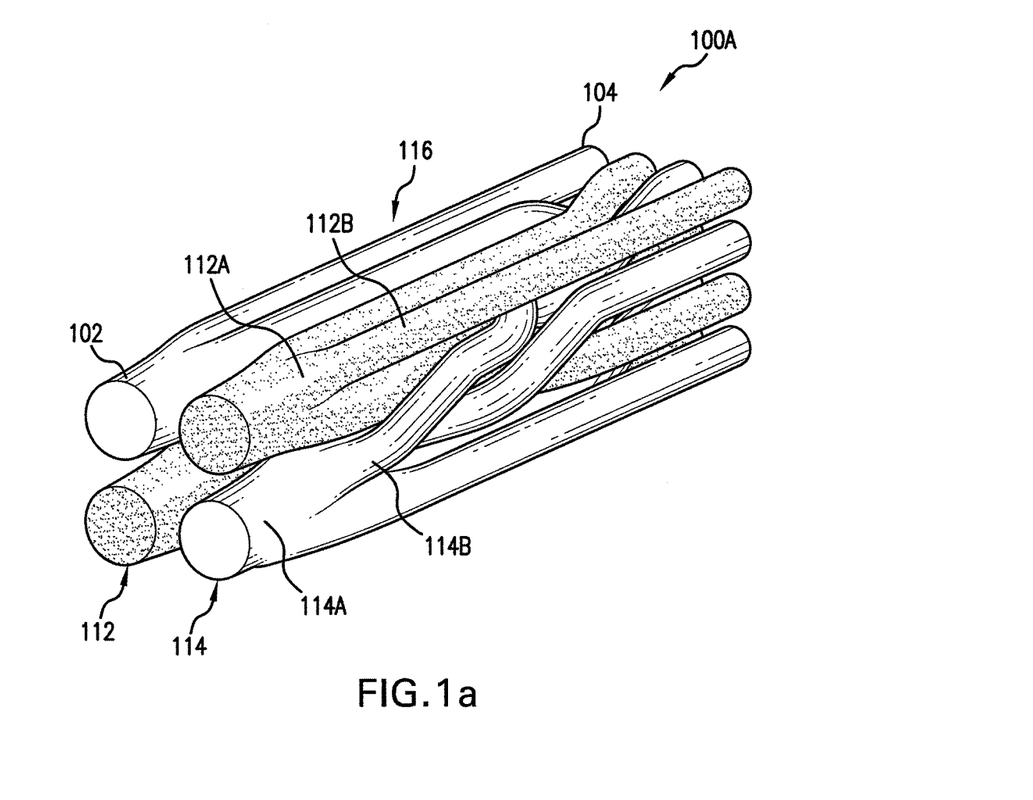
FIG. 1a illustrates a three-dimensional image of one-half of passages for a two-fluid heat exchanger with sixteen branching geometry in an embodiment.
Figure 1B:
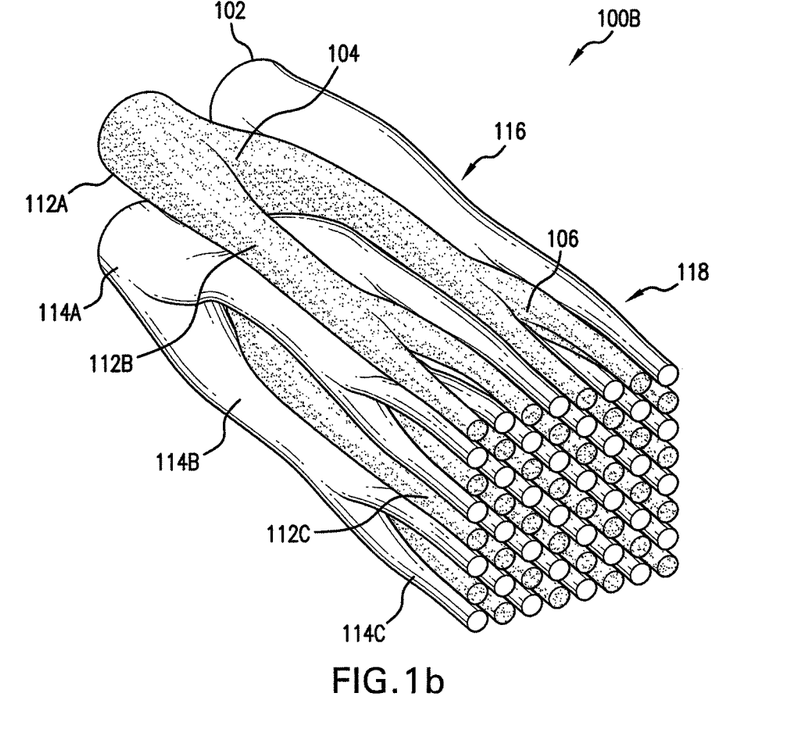
FIG. 1b illustrates a three-dimensional image of one-half of passages for a two-fluid heat exchanger with sixty-four branching geometry in an embodiment.
Figure 1C:
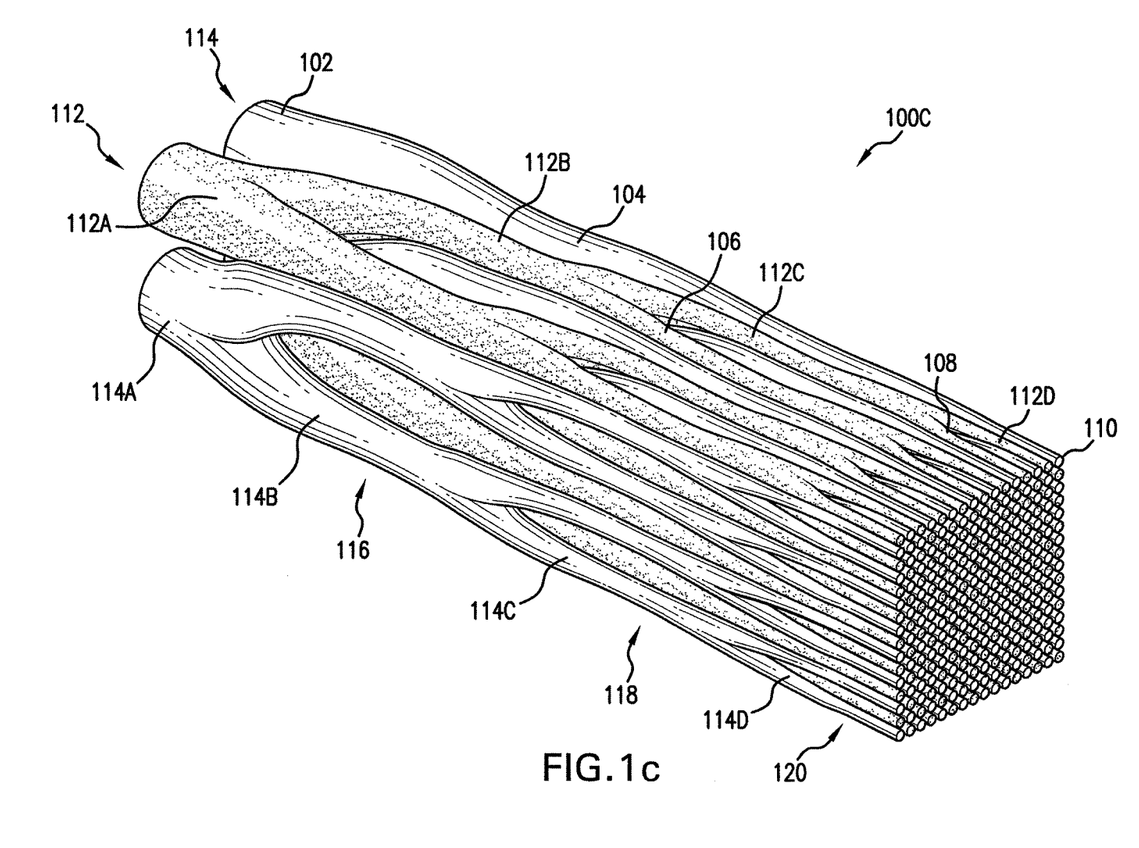
FIG. 1c illustrates a three-dimensional image of one-half of passages for a two-fluid heat exchanger with two-hundred and fifty six branching geometry in an embodiment.
Figure 1D:
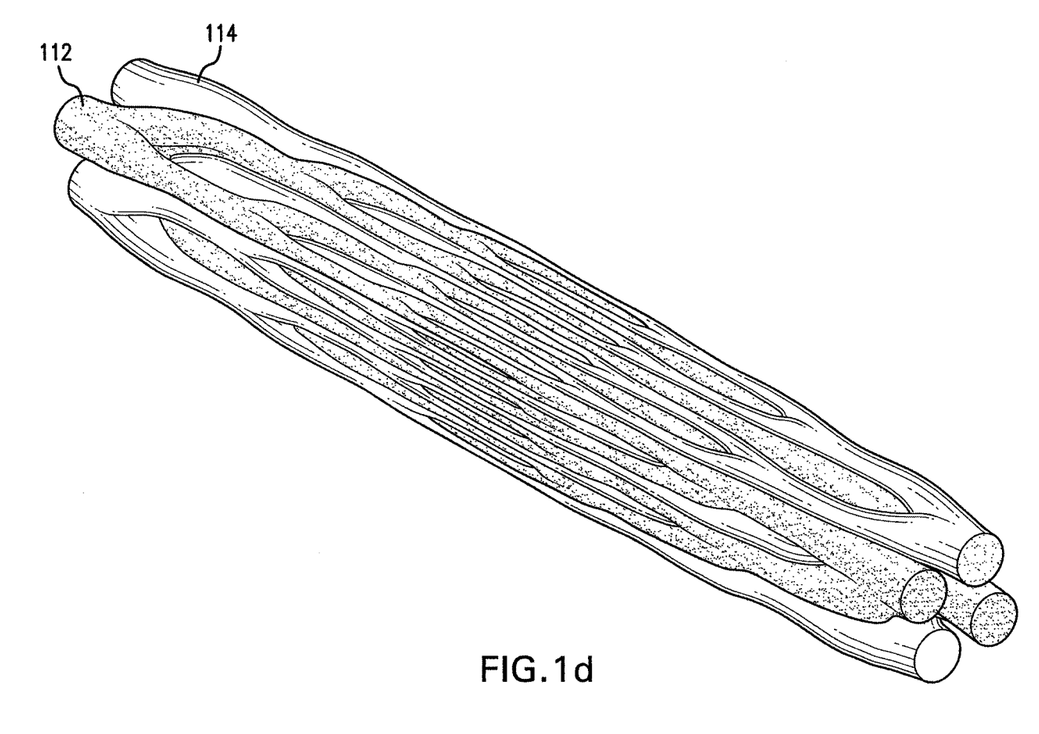
FIG. 1*d* illustrates three-dimensional images of passages for a two-fluid heat exchanger with two-hundred and fifty six branching geometry in an embodiment.

The two-fluid heat exchanger with low-drag path may have geometries with large contact areas for effective heat transfer. Branching can achieve large contact areas and may be particularly desirable. According to embodiments of the present disclosure, FIGS. 1*a*-1*c* illustrate three-dimensional images of one-half of passages for a two-fluid heat exchanger with sixteen branching geometry 100A, sixty four branching geometry 100B, and two-hundred and fifty six branching geometry 100C, respectively. FIG. 1*d* illustrates a three-dimensional image of flow passages for a complete two-fluid heat exchanger with two-hundred and fifty six branching geometry 100C. A first flow passage 112 is for one fluid, such as colder fluid, and a second flow passage 114 is for the other fluid, such as a warmer fluid, as depicted for example in FIG. 1*a*.

In FIGS. 1*a*-1*d*, flow passages of a two-fluid heat exchanger with different branching geometries are illustrated as solid, with surrounding material removed for ease of visualization. Accordingly, as illustrated for example in FIG. 1*a*, the hollow passages 112, 114 are rendered solid. The passages 112, 114 may include various portions (e.g., 112A-112D, 114A-114D). With two stages of branching and deformation, an initial set of four passages or parent channels (two passages 112A and two passages 114A) gradually leads to a set of sixteen narrower passages 112B, 114B. As illustrated in FIG. 1*b*, sixteen narrower passages 112B, 114B may further split into a set of sixty four even narrower passages or subchannels 112C, 114C. The heat exchanger that corresponds to this geometry may include additional branching stages, for example, with three such sets embedded in one another with a total of two hundred fifty six alternating passages or subchannels 112D, 114D, as illustrated in FIG. 1*c*, or more with additional branching stages (not shown).

Referring to FIG. 1*a* again, two passages 112 each have an inlet or entrance end 112A for one fluid near end 102, and two passages 114 each have an outlet or exit end 114A for another fluid near end 102. Near end or position 102, each of passages 112A, 114A starts to split into four narrower passages 112B, 114B during a first branching stage 116, resulting in a set of sixteen passages 112B, 114B near position 104. As shown in FIG. 1*b*, a second branching 118 may split each of the sixteen passages 112B, 114B near position 106 into four narrower passages, resulting in a total of sixty four passages 112C, 114C near position 108. FIG. 1*c* illustrates the outcome of a third branching 120, by which each of the sixty four passages 112C, 114C splits into four narrower passages for a total of two hundred fifty six passages 112D, 114D near position 110. In the embodiment of FIG. 1*c*, during each branching 116, 118, 120, each passage splits into four passages; but other embodiments may have branching stages that split a parent tube into fewer or more than four child passages or subchannels.

Because each of branching stages 116, 118, 120 generates additional contact area for the fluids to exchange heat, the amounts of both transferred heat and wall friction to which the fluids are subjected increase with each branching. Consequently, there is often a balanced point or optimized point where the ratio of transferred heat to mechanical energy lost is the highest for a particular number of branching stages, with fewer stages accomplishing less than optimal heat transfer and additional stages generating more than optimal mechanical energy loss. Therefore, for each heat exchanger, the number of branching may vary depending upon the dimension and geometry of the exchanger and the type of fluid. The desirable number of branching stages may also vary with desired operating temperature at which a heat exchange occurs.

According to embodiments of the present disclosure, flow channels for the two fluids remain separated by a solid material so that the two fluids, such as warmer and colder fluids, do not mix and disparate pressures may be maintained. The solid barrier or component that separates the flow channels or passages may be monolithic. An advantage of monolithic construction is that solid components cannot become disconnected from the main body and rattle inside the heat exchanger. Furthermore, in order not to unduly obstruct flow of the two fluids, the cross-sectional area of channels for each fluid needs to be nearly uniformly preserved through the transformation process of branching. Mathematically, this can be accomplished by using an area-conserving transformation algorithm, but perfect uniformity is not required and a small relative change in cross-sectional area is generally acceptable. Cross-sectional areas of all passages for each fluid may remain approximately unchanged in every panel or cross-section of the two-fluid heat exchanger.

FIGS. 2a-2d illustrate a first branching-deformation technique according to embodiments of the present disclosure. FIGS. 2a-2d show four different cross-sections 202, 204, 206, and 208 of the two-fluid heat exchanger 200 at the entrance end or exit end and during the first branching stage 116. The entire heat exchanger is formed by repeating the branching geometry on each smaller branch for a number of times and then reversing every branching to return the geometry to its initial shape at the other end of the heat exchanger. All four cross-sections 204-208 may have the same area. Heat exchanger 200 has a geometry based on sequential branching of circular passages in sets of four. Each branching stage combines the splitting of the larger passages into narrower passages with a certain amount of twisting among neighboring passages so that, at the conclusion of each branching stage, the various passages form an alternating pattern that places in closest proximity the passages conducting one fluid with those conducting the other fluid. The intermingling occurs concurrently with the splitting. Such branching with gradual change in geometry may reduce mechanical friction compared to arrangement with abrupt geometric changes. For the purpose of the presentation below, an illustrative warmer fluid (gas, or liquid, or condensing gas, or vaporizing liquid) is depicted in passages or circles having odd numbers 1, 3, and an illustrative colder fluid (gas, or liquid, or condensing gas, or vaporizing liquid) is depicted in passages or circles having even numbers 2, 4. A solid barrier 210 separates the passages 1, 3 for passing the warmer fluid from the passages 2, 4 for passing the colder fluid. The solid barrier 210 may be made of any thermally conducting material, such as a metal.

Figure 2A:
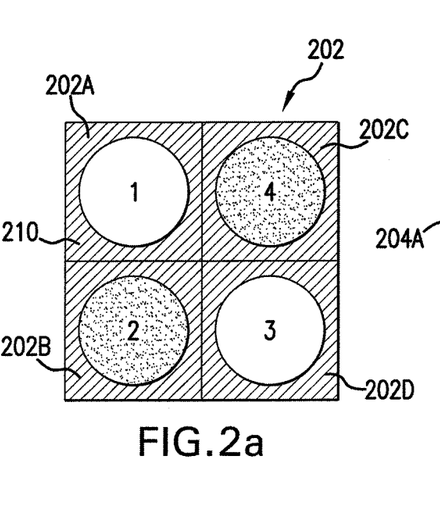
FIGS. 2*a*-2*d* illustrate a first method of branching and deformation that turns a two-by-two arrangement of passages into a four-by-four arrangement with alternation of passages for two fluids, in an embodiment.

FIG. 2a illustrates that heat exchanger 200 has a first square cross-section 202 that includes four circular passages or channels 1-4. For the purpose of visualization, the square cross-section is equally divided into four smaller square divisions. One of the circular passages 1-4 is disposed in each of the four divisions, respectively, with circular passages 1, 3 positioned on one diagonal of cross-section 202 and circular passages 2, 4 positioned on the opposite diagonal of cross-section 202.

Figure 2B:
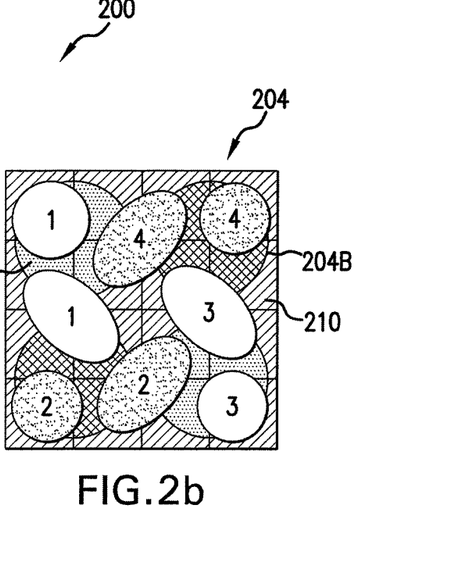

Further into heat exchanger 200, FIG. 2b illustrates that heat exchanger 200 has a second square cross-section 204 that includes eight passages in an embodiment. This square shape 204 may or may not have the same size as the antecedent shape 202. Each passage 1-4 of cross-section 202 splits into two branches and retain the parent's numbering. As one proceeds further along the length of heat exchanger 200, slightly larger and elongated illustrated branches may further branch, each into three branches at a third square cross-section 206 of heat exchanger 200. While these branches emerge, they twist around one another as illustrated in FIG. 2c and become more circular until a four-by-four pattern of alternating circular passages, i.e. a total of sixteen passages, is achieved in a fourth square cross-section 208 of heat exchanger 200, as illustrated in FIG. 2d.

Figure 2C:
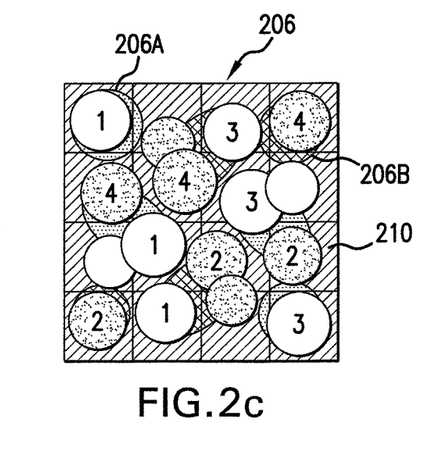
Figure 2D:
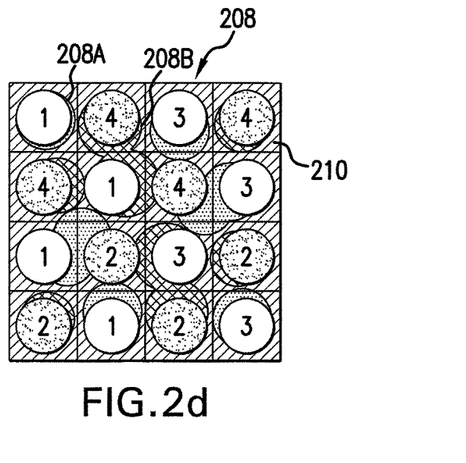

In FIGS. 2b-d, for ease of visualization, patterns 204A, 206A, and 208A depict the positions that the respective passages occupied in the previous section in order to illustrate the amount of change that takes place from one section to the next section for one fluid, patterns 204B, 206B, and 208B for the other fluid. Each of the four two-by-two subsets of this pattern can in turn be subjected to the same or a similar transformation (at half the scale) to create a new pattern of eight-by-eight alternating circular passages, for a total of sixty four passages or channels. Each of the sixty four passages may in turn split into four passages to yield a new pattern of sixteen-by-sixteen alternating circular passages, for a total of two hundred fifty six passages. This process may continue until a desired scale is reached. This successive branching and twisting constitutes the first half of the heat exchanger. The second half is generally identical to the first half except for being reversed in space so that the complete object contains passages that successively divide and regroup. The geometry is such that one-half of the object is a generally mirror image of the other half.

Figure 3A:
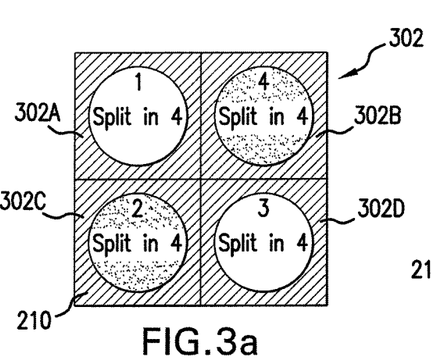
FIGS. 3*a*-3*e* show an alternative method of branching and twisting that that turns a two-by-two set of passages into a four-by-four set of passages with alternation of passages for two fluids, in an embodiment.
Figure 3B:
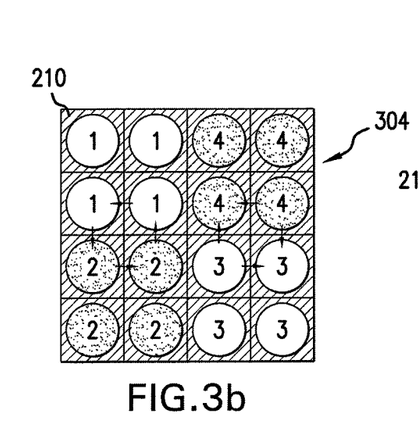
Figure 3C:
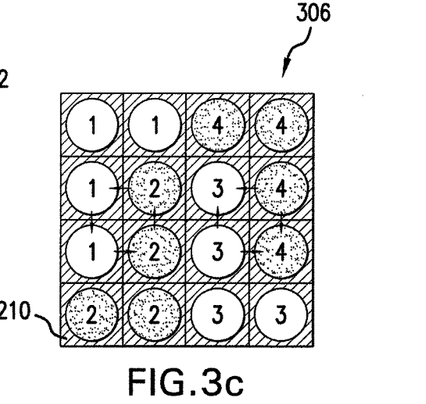

As shown in FIGS. 3a-3c, alternative methods of branching and twisting that also leads to the gradual deformation of an initial two-by-two set of alternating passages to a four-by-four set of alternating passages may instead (or additionally) be utilized. FIGS. 3a-3e illustrate geometric arrangement of cross-sections 302, 304, 306, 308, and 310 of heat exchanger 300 at different depths from one end, either for flow entry or exit, according to embodiments of the present disclosure. Again, this procedure may be repeated until a desired level of fine scale is reached. And as with the heat exchanger 200, successive branching may constitute only the first half of the heat exchanger 300. A mirror second half may be used to regroup the branches and complete the structure of the heat exchanger. As depicted in FIGS. 3a-3e, splitting followed by intermingling is different from branching-deformation techniques where intermingling occurs concurrently with the splitting.

FIG. 3a illustrates a square cross-section 302 that corresponds to either end of the two-fluid heat exchanger 300 in an embodiment. In the shown embodiment, the external shape of the heat exchanger 300 is square. Alternative embodiments may include other shapes. Square cross-section 302 includes four passages or circles 1-4 uniformly distributed in four subdivisions 302A-D of square cross-section 302, respectively. Each of the passages 1-4 may for example be located generally at the center of the respective subdivisions 302A-D. Passages 1 and 3 indicate areas where one fluid, such as a warmer fluid, enters or exits heat exchanger 300. Passages 2 and 4 indicate areas where another fluid, such as a colder fluid, exits or enters the heat exchanger. In the shown embodiment, passages are identical in size. However, in alternative embodiments passages 1-4 may not have identical size. The rest of the cross-sectional area that excludes the passages in cross-section 302 indicates a fixed, solid, thermally conductive material, such as a metal.

The first geometric change undergone by the passages 1-4 as they penetrate into heat exchanger 300 is a split of each of the passages 1-4 into four branches or sub-channels 1-4 of generally equal size to each other, yielding the arrangement of sixteen passages as shown on FIG. 3b. The total cross-section area of four sub-channels or passages 1, 2, 3, or 4 substantially equals to that of the parent passage 1, 2, 3, or 4, respectively.

FIG. 3b illustrates a geometric arrangement of the sixteen passages for two fluids at a cross-section 304 of heat exchanger 300, following the split of each of the parent four passages into four child branches or sub-channels, in an embodiment. The sixteen passages or circles 1-4 are shown uniformly distributed in sixteen square subdivisions 304A-P of square cross-section 304, and the subdivisions have generally the same size. Other embodiments may include other geometric arrangements and sizes. A further change undergone by the geometric arrangement as one proceeds further along the length of the heat exchanger 300 is a rotation by about 90° of selected groups of four passages, as indicated by the arrows in FIG. 3b. The resulting longitudinal twist of the implicated branches yields, at some further inward distance into heat exchanger 300, the arrangement shown in FIG. 3c.

FIG. 3c illustrates a cross-section 306 that includes a geometric arrangement of the sixteen passages for two fluids following the rotation depicted in FIG. 3b. Another change in geometry still further into heat exchanger 300 is formed by again rotating the same groups of four passages by about 90°, as indicated by the arrows in FIG. 3c. The resulting longitudinal twist of the implicated branches yields, at some further inward distance or depth into heat exchanger 300, the arrangement shown in FIG. 3d.

Figure 3D:
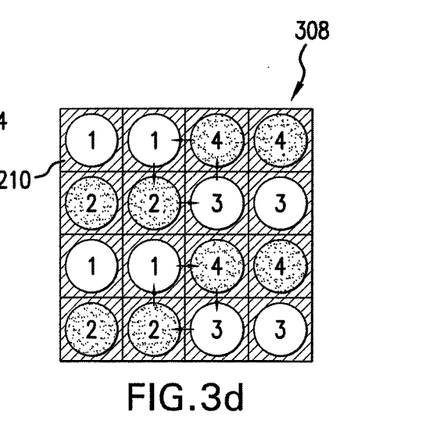

FIG. 3d illustrates a cross-section 308 that includes a geometric arrangement of the sixteen passages following the rotation depicted in FIG. 3c. Another change in geometry further along heat exchanger 300 is formed by rotating some different groups of four passages by about 90°, as indicated by the arrows in FIG. 3d. The resulting longitudinal twist of the branches yields, at some further inward distance along heat exchanger 300, the arrangement shown in FIG. 3e.

Figure 3E:
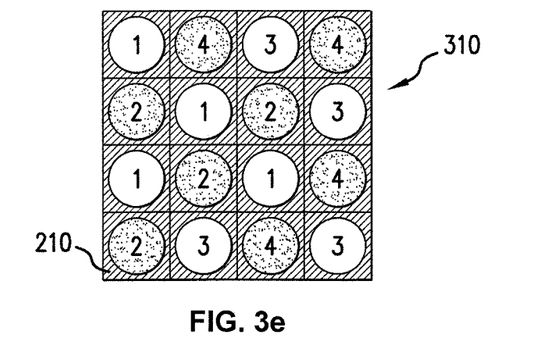

FIG. 3e illustrates a cross-section 310 that includes a geometric arrangement of the sixteen passages following the rotation depicted in FIG. 3d. Cross-section 310 includes a regular alternation of passages having odd and even numbers. Such a geometry arrangement reduces the distance between passages of two fluids, such as warmer and colder fluids, and thus increases heat transfer between the two fluids, compared to the arrangement shown in FIG. 3b. Yet another change in geometry as one proceeds further into the heat exchanger is the splitting of each passage into four branches, yielding a total set of sixty four passages, and the described rotations may be performed on groups of four smaller passages. Splitting of each passage into four narrower passages followed by a similar of rotations may be repeated as many times as desired. The position where the maximum number of passages is achieved may mark the middle of the heat exchanger 300, and the second half of the heat exchanger may consists of a generally mirror image of the first half along which all the passages recombine into only four passages. Both extremities of the heat exchanger may be substantially identical to each other.

There are several methods for fabricating heat exchangers with the three-dimensional (3-D) twisted geometry as disclosed. Currently, manufacturing techniques do not permit hollowing out the 3-D object from a solid block of metal. However, a stacking approach may be used for fabrication of the heat exchanger. In this stacking approach, the heat exchanger is considered as a stack of many thin panels, with each panel or slide containing a number of hollowed passages. The hollowed pattern varies slightly from slide to slide so that when all slides are stacked a gradually varying pattern is obtained that approximates the desired continuous 3-D geometry by small steps.

In a first half of the heat exchanger or object, as one progresses inward from the one end and toward the middle, the number of branches increases. Overlapping holes from one slide to the next slide creates a continuous passage or conduit for fluid flow, and thus generates a two-fluid, multi-channel heat exchanger. In the second half of the object, a second set of generally identical slides may be stacked in reverse order, gradually regrouping the many smaller channels in fewer larger channels. The second half of the object thus may have a generally mirror image of the first half.

The stack of thin plates may use one consistent material, or a combination of different materials. Any thermally conductive material may be appropriate for use, such as metals or plastics with conductive fillers. Holes may be formed in the plates by stamping, drilling, punching, casting, or any other appropriate process, and the location of the holes may be determined, for example, by computer design.

With the series of plates are arranged in proper order, various methods may be used to maintain the positions, as will be appreciated by those skilled in the art. For example, mechanical fasteners such as bolts may apply a tightening squeeze to the stack of plates. The mechanical fasteners may be placed in the four corners or other appropriate location to avoid interference with the flow passages in the plates.

Layered manufacturing is an alternative industrial method that enables the manufacture of complex three-dimensional shapes. With this technique, the object is first described mathematically in a computer model. The object is dissected slice by slice based upon the modeling stored in a computer, and the shape of each slice is then sent to a manufacturing unit, which consists of a material delivery system capable of depositing a thin layer of liquid metal or other liquid material in a non-uniform way that matches the pattern stored in the computer. After completion of depositing one layer, the liquid is allowed to have a period of time to solidify. Once the liquid is solidified, the computer sends the information about the next layer to the manufacturing system, which builds it on existing layers. In this way, an entire object may be built layer-by-layer. For example, the company Melotte (www.melotte.be) offers production directly from computer-aided design (CAD) to prototype metal parts made from metallic powder through layer-by-layer fusion.

Selective laser melting is a generative layer manufacturing technology. It manufactures parts for a product directly from electronic data. It generates a three-dimensional geometry of nearly any shape, regardless of its complexity. Other methods may include, but are not limited to, metal printing or direct laser metal sintering.

Aluminum, a very good thermal conductor, may be used in layered manufacturing for constructing two-fluid heat exchangers according to embodiments of the present disclosure. Aluminum powders may first be heated to a melt state in a mold. Each aluminum layer is very thin such that the aluminum layer solidifies quickly. Then, the next layer can be built up by solidifying an additional aluminum layer.

The number of required layers depends on the type of machine that does the layered manufacturing. Each layer of manufacturing typically should not be thicker than one-fifth of the diameter of the narrowest opening. Dimensions of the heat exchanger may vary with the application.

Figure 4:
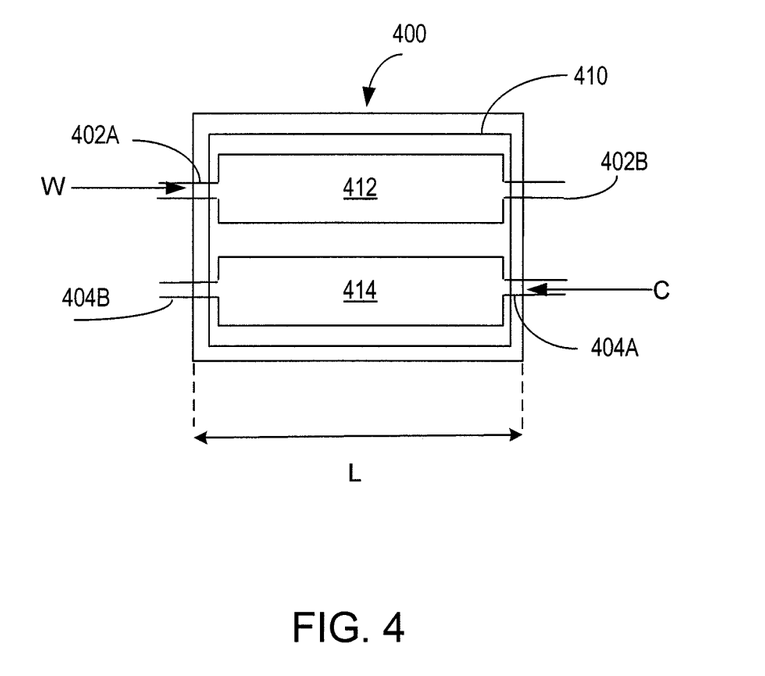
FIG. 4 illustrates a simplified diagram for heat exchanger in an embodiment.

In an example embodiment, a heat exchanger collects heat from used shower water to preheat incoming clean water. The heat exchanger permits changing of water while retaining the heat. FIG. 4 illustrates a simplified diagram for such a heat exchanger that uses the flow passages as described above. As shown in FIG. 4, a heat exchanger 400 includes flow passages 410 that include a flow passage 412 for shower water and a flow passage 414 for clean water. Flow passages 412 and 414 may have one of the branching geometries 100A, 100B, and 100C, as illustrated in FIGS. 1a-1c. For example, flow passages 412 and 414 may be implemented by flow passages 112 and 114, respectively. Heat exchanger 400 also includes an inlet 402A and an outlet 402B for shower water to flow through heat exchanger 400 as pointed by arrow W. Heat exchanger 400 also includes an inlet 404A for clean water to flow into heat exchanger 400 and an outlet 404B for clean water to flow out of heat exchanger 400 as pointed by arrow C. The shower water exchanges heat with the clean water inside heat exchanger 400 to warm the clean water.

In a particular embodiment, heat exchanger 400 with three successive branching stages, resulting in two hundred fifty six passages as illustrated in FIG. 1 *c*, is sufficient to provide the desired level of heat exchange. According to embodiments of the present disclosure, each of initial passages 1, 2, 3, 4, as illustrated in FIG. 2*a*, may have a diameter of two inches or 50.8 mm. Each of three branching stages is six inches or 152.4 mm long and a total length L of three branching stages is 2×3×152.4 mm=914.4 mm or thirty-six inches long. The example heat exchanger 400 may have a square cross-section (as illustrated in FIG. 2*a*) of six inches by six inches or 914.4 mm by 914.4 mm. Those skilled in the art will readily appreciate that dimensions may be altered in various embodiments, and that heat exchanger 400 is only an example.

At a typical shower rate of two gallons per minute, the heat exchanger 400 with the above dimensions gives an inlet flow velocity of 0.03 m/s. Low fluid velocity is one design parameter for heat exchanger. When fluid velocity decreases, heat exchange increases and friction decreases. Efficiency of the heat exchanger may vary with fluid velocity and dimensions of the heat exchanger. Generally, an efficiency of the heat exchanger increases with decreasing fluid velocity. The efficiency also decreases with initial diameter of the passages and increases with the length of the passage.

Example heat exchanger 400 is made of aluminum. Frictional pressure loss between inlet 402A and outlet 402B or between inlet 404A and outlet 404B is about six Pa (Pascals), corresponding to an energy loss per unit time of 0.756 mW (milliwatts). Warm water entering inlet 402A is at a temperature of 49° C., and cold water entering inlet 404A is at a temperature of 15° C. After warm water 418 exchanges heat with cold water 416 in heat exchanger 400, the warm water exits outlet 404A at approximately a temperature of 29° C., and the cold water exits outlet 404B at approximately a temperature of 35° C. Note that the cold water rises to a temperature (35° C.) higher than the exit temperature (29° C.) of the warmer water through the heat exchanger. These conditions result a heat exchange of 10.55 kW (kilowatts) and a heat exchange efficiency of about 60%.

The heat exchanger efficiency is obtained by dividing an actual temperature rise in a colder fluid by an ideal temperature rise with a complete heat exchange from a warmer fluid to the colder fluid. In a particular embodiment, the ideal temperature rise in the cold water is 49° C.−15° C.=34° C., while the actual temperature rise in the cold water is 35° C.−15° C.=20° C. Therefore, the efficiency equals to 20° C. divided by 34° C., which yields 0.59 or 59%.

Assume that coefficient of performance (COP) is defined by the following equation:

COP=(Heat Exchanged per unit time in kW)/(Energy Loss per unit time in mW)

In a particular embodiment, the COP of heat exchanger 400 equals to 10.55 divided by 0.756, which is about 14. In contrast, conventional heat exchangers with similar heat-exchange efficiencies of about 60%, such as gravity film heat recovery units used to capture heat from used shower water to preheat fresh water in buildings, have a COP in a range of 0.25 to 3.

It may be desirable to have smooth tubular passages such that friction may be minimized. According to embodiments of the present disclosure, a rinse with a gently eroding agent, such as an acid, may be used for polishing inside the passages as one of the last manufacturing steps. Such chemical polishing may allow the heat exchanger to have coarser manufacturing at earlier steps of fabrication. In alternative embodiments, a fluid containing abrasive material may be pumped through passages to erode high points to obtain smooth internal surfaces.

With the above-disclosed processes, a great variety of patterns may be generated. For example, the channels for two fluids need not be of equal cross-sections. One fluid, such as a compressed refrigerant, may have a smaller cross-section in its passages, and another fluid, such as air at nearly atmospheric pressure, may have a larger cross-section in its passages.

The low friction heat exchanger may improve heat transfer in the condenser and evaporator of an air-conditioning unit, or other heat exchangers including, but not limited to, refrigerators, heat pumps, automotive radiators, building ventilation systems, air-conditioning, water heaters, and boilers. Other applications for the heat exchanger may include commercial dishwashers, swimming pools, and thermal crackers etc.

Additional applications include water-to-water, air-to-air and water-to-air systems, such as moving heat from antifreeze solution heated by solar thermal panels on the roof of a house to fresh water for domestic plumbing, heat recovery from exhaust air in buildings, and automotive radiator etc. An air-to-air heat exchanger may be larger in dimensions than a water-to-water heat exchanger, in the ratio of a ventilation air duct to a copper water pipe in a building. An air-to-water heat exchanger may be asymmetrical to accommodate larger passages for the air than for the water. The heat exchanger may be used with other fluids besides air and water, such as refrigerants, oils, alcohols, oxygen, combustion fumes, steam, or one of many other possible fluids.

Having described several embodiments, it will be recognized by those skilled in the art that various modifications, alternative constructions, and equivalents may be used without departing from the spirit of the invention, for example, variations in shapes of hollowed passages in heat exchangers, material selection, variation in dimensions, arrangement in positions, departure from symmetry, and areas of flow passages. Additionally, a number of well known processes and elements have not been described in order to avoid unnecessarily obscuring the present invention. Accordingly, the above description should not be taken as limiting the scope of the invention.

It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed:

1. A heat exchanger for use with first and second fluids, comprising:
   a first flow passage for transporting the first fluid, the first flow passage having a first entrance end and a first exit end; and
   a second flow passage for transporting the second fluid, the second flow passage having a second entrance end and a second exit end, the second flow passage being physically separated from the first flow passage by a thermally conducting material; wherein:
   the first entrance end and the second exit end are adjacent a first end of the heat exchanger, and the first exit and the second entrance are adjacent an opposed second end of the heat exchanger;

each flow passage comprises a parent channel adjacent the heat exchanger first end;

each parent channel is split into a plurality of first sub-channels during a first branching stage, a plurality of the first sub-channels being split into a plurality of second sub-channels during a second branching stage; and the heat exchanger has a center portion with a maximum number of sub-channels, the first flow passage being generally symmetrical about the center portion, and the second flow passage being generally symmetrical about the center portion.

2. The heat exchanger of claim 1, wherein the first fluid at the first entrance end has a different temperature from the second fluid at the second entrance end; and wherein the center portion provides a maximum heat transfer between the first and second fluids.

3. The heat exchanger of claim 1, wherein each flow passage has generally circular cross-sections near the respective entrance and exit ends.

4. The heat exchanger of claim 1, wherein the thermally conducting material comprises aluminum.

5. The heat exchanger of claim 1, wherein the thermally conducting material comprises a monolithic structure.

6. The hear exchanger of claim 1, wherein:
a cross-sectional area of each parent channel is substantially equal to a total of cross-sectional areas of the plurality of first sub-channels; and
the cross-sectional area of each parent channel is substantially equal to a total of cross-sectional areas of the plurality of second sub-channels.

7. The heat exchanger of claim 1, wherein the first flow passage and the second flow passage have internal surfaces that are chemically polished.

8. The heat exchanger of claim 1, wherein the heat exchanger comprises two parent channels for each flow passage adjacent the heat exchanger first end.

9. The heat exchanger of claim 1, wherein a plurality of the second sub-channels for each flow passage is split into a plurality of third sub-channels during a third branching stage such that two hundred and fifty six alternating sub-channels are present adjacent the center portion.

10. The heat exchanger of claim 1, wherein the first and second fluids are each selected from the group consisting of water, air, refrigerant, oils, alcohol, oxygen, combustion fume, and steam.

11. The heat exchanger of claim 1, wherein the heat exchanger has a substantially square cross section.

12. A method for fabricating a heat exchanger, comprising:
forming through-holes in a plurality of layers, the through-holes having different sizes and locations such that the plurality of layers have gradually varying patterns of the through-holes;

stacking a first half of the plurality of layers to form a first half of the heat exchanger, such that the through-holes form half of a first flow passage for a first fluid and half of a second flow passage for a second fluid, the second flow passage being physically separated from the first flow passage, the first half of the heat exchanger spanning from a first end of the heat exchanger to a center portion of the heat exchanger, wherein:
the through-holes are configured and arranged such that each flow passage has at least one parent channel adjacent the first end of the heat exchanger;
each parent channel is split into a plurality of first sub-channels extending away from the first end of the heat exchanger during a first branching stage;

a plurality of the first sub-channels are split into a plurality of second sub-channels during a second branching stage, the plurality of second sub-channels extending at a further depth than the plurality of first sub-channels from the first end of the heat exchanger; and stacking a second half of the plurality of layers in a reverse sequence from the first half of the plurality layers to form a second half of the heat exchanger, the second half and the first half of the heat exchanger being substantially symmetric about the center portion of the heat exchanger.

13. The method of claim 12, wherein each layer has a thickness equal to or less than one-fifth of a smallest diameter of the second sub-channels.

14. The method of claim 12, further comprising chemically polishing internal surfaces of the first and second flow passages.

15. The method of claim 12, further comprising rinsing the first and second flow passages with an acid.

16. The method of claim 12, further comprising pumping a fluid containing abrasive material through the first and second flow passages.

17. The method of claim 12, further comprising fastening the plurality of layers with mechanical fasteners.

18. The method of claim 12, wherein the heat exchanger comprises two parent channels for each flow passage adjacent the first end of the heat exchanger.

19. The method of claim 12, wherein a plurality of the second sub-channels for each flow passage are split into a plurality of third sub-channels during a third branching stage such that two hundred and fifty six alternating sub-channels are present adjacent the center portion.

20. The method of claim 12, wherein each flow passage has nearly circular cross-sections adjacent the first end of the heat exchanger.

21. The method of claim 12, wherein the plurality of layers comprise a thermally conductive material.

22. The method of claim 12, wherein the thermally conducting material comprises aluminum.

23. The method of claim 12, wherein a cross-sectional area of each parent channel substantially equals a total of the cross-sectional areas of the respective plurality of sub-channels for each flow passage.

24. The method of claim 12, wherein the first and second fluids each comprise a material selected from the group consisting of water, air, refrigerant, oils, alcohol, oxygen, combustion fume, and steam.

25. A method for fabricating a heat exchanger, the method comprising:
providing metallic powders;
melting the metallic powders; and
solidifying the melted metallic powders into subsequent layers; wherein:
the layers have through-holes of different sizes and locations such that the plurality of layers have gradually varying patterns of the through-holes;
the through-holes form a first flow passage for a first fluid and a second flow passage for a second fluid, the second flow passage being physically separated from the first flow passage;
each of the first and second flow passages has a parent channel near a first end of the heat exchanger;
each parent channel is split into a plurality of first sub-channels during a first branching stage;

a plurality of the first sub-channels are split into a plurality of second sub-channels during a second branching stage; and each flow passage is substantially symmetrical about a center portion of the heat exchanger.

26. The method of claim 25, wherein each layer has a thickness equal to or less than one-fifth of a smallest diameter of the second sub-channels.

27. The method of claim 25, further comprising chemically polishing internal surfaces of the first and second flow passages.

28. The method of claim 25, further comprising rinsing the first and second flow passages with an acid.

29. The method of claim 25, further comprising pumping a fluid containing abrasive material through the first and second flow passages.

30. The method of claim 25, further comprising fastening the plurality of layers with mechanical fasteners.

31. The method of claim 25, wherein the heat exchanger comprises two parent channels for each flow passage adjacent the first end of the heat exchanger.

32. The method of claim 25, wherein a plurality of the second sub-channels for each flow passage are split into a plurality of third sub-channels during a third branching stage such that two hundred and fifty six alternating sub-channels are present adjacent the center portion.

33. The method of claim 25, wherein each flow passage has a generally circular cross-section adjacent the first end of the heat exchanger.

34. The method of claim 25, wherein the plurality of layers comprise a thermally conductive material.

35. The method of claim 34, wherein the thermally conductive material comprises aluminum.

36. The method of claim 25, wherein a cross-sectional area of each parent channel substantially equals a total of the cross-sectional areas of the respective plurality of sub-channels for each flow passage.

37. The method of claim 25, wherein each fluid comprises a material selected from the group consisting of water, air, refrigerant, oils, alcohol, oxygen, combustion fume, and steam.

* * * * *

UNITED STATES PATENT AND TRADEMARK OFFICE
CERTIFICATE OF CORRECTION

Page 1 of 1

PATENT NO. : 9,134,072 B2
APPLICATION NO. : 13/635591
DATED : September 15, 2015
INVENTOR(S) : Rosin et al.

It is certified that error appears in the above-identified patent and that said Letters Patent is hereby corrected as shown below:

In The Specification

Column 7, line 43, "consists" should read --consist--;

Column 8, line 10, "plates are arranged" should read --plates arranged--;

Column 9, line 42, "result a heat" should read --result in a heat--;

In The Claims

Column 11, line 25, "hear exchanger" should read --heat exchanger--.

Signed and Sealed this
First Day of March, 2016

Michelle K. Lee
*Director of the United States Patent and Trademark Office*